R. H. MANLEY.
CONCENTRATOR.
APPLICATION FILED AUG. 22, 1907.
899,312.
Patented Sept. 22, 1908.
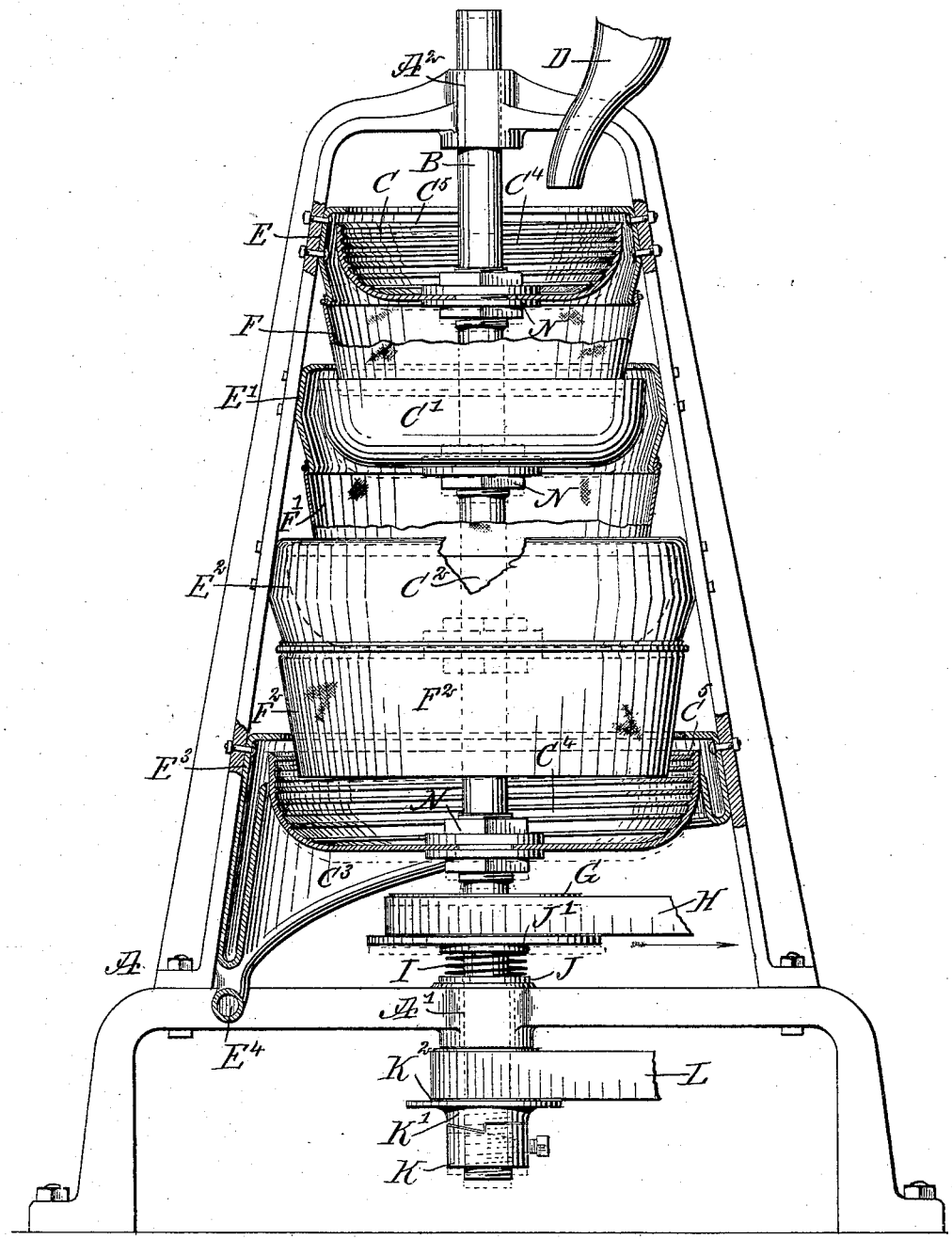
WITNESSES
INVENTOR
Ray Haltic Manley
BY
ATTORNEYS

UNITED STATES PATENT OFFICE.

RAY HALLIC MANLEY, OF STOCKTON, CALIFORNIA.

CONCENTRATOR.

No. 899,312.   Specification of Letters Patent.   Patented Sept. 22, 1908.

Application filed August 22, 1907. Serial No. 389,639.

*To all whom it may concern:*

Be it known that I, RAY HALLIC MANLEY, a citizen of the United States, and a resident of Stockton, in the county of San Joaquin and State of California, have invented a new and Improved Concentrator, of which the following is a full, clear, and exact description.

The object of the invention is to provide a new and improved concentrator for separating heavy materials from lighter ones, such as gold from sand or other extraneous matter, and arranged to allow of effectively treating a large quantity of material in a comparatively short time and with or without the use of water.

The invention consists of novel features and parts and combinations of the same, which will be more fully described hereinafter and then pointed out in the claims.

A practical embodiment of the invention is represented in the accompanying drawing forming a part of this specification in which the figure is a side elevation of the improvement, parts being shown in section.

A suitably constructed frame A is provided with vertically alined bearings $A'$, $A^2$ for a shaft B to rotate in, and on the said shaft B are secured a plurality of centrifugal open top vessels C, $C'$, $C^2$ and $C^3$, located one below the other, the vessels gradually increasing in size, as plainly indicated in the drawing. Each of the vessels C, $C'$, $C^2$ and $C^3$ is approximately bowl-shaped and is provided at the inside with a riffle $C^4$, preferably in the form of a spiral, and leading from or near the bottom of the vessel to an annular riffle $C^5$, arranged at the upper edge of the corresponding vessel. The material to be treated is delivered into the uppermost and smallest vessel C through a suitable chute D, and when the machine is in operation the material fed into the upper vessel C is subjected to centrifugal action, so that the lighter material is thrown out of the vessel while the heavier material is retained within the vessel and under the riffles $C^4$, $C^5$. The thrown out material comes in contact with an annular apron E secured to the main frame A and provided at its bottom with an extension F of canvas or other material, and reaching into the next following vessel $C'$ below, so that the thrown-out material from the vessel C passes by way of the aprons E and F into the next vessel $C'$ below. As the material is delivered to the vessel $C'$ at the bottom thereof, it is evident that when the machine is in operation a separation of the heavier and lighter materials take place, that is, the lighter material in the vessel $C'$ is finally thrown out and against an apron $E'$ secured to the main frame A, and having an extension apron $F'$ for delivering the thrown-out material into the next vessel $C^2$ below. This vessel is surrounded by an apron $E^2$ having an extension $F^2$ for delivering the material thrown out of the vessel $C^2$ into the bottom vessel $C^3$, from which the thrown-out material passes into a pocket $E^3$ secured to the main frame A, and having an inclined bottom leading to an outlet $E^4$, for discharging the lighter material to one side of the machine. It is understood that the several aprons E, $E'$ and $E^2$ surround the corresponding vessels C, $C'$ and $C^2$, and the pocket $E^3$ surrounds the vessel $C^3$. The extension aprons F, $F'$ and $F^2$ deliver the thrown-out material from the vessels C, $C'$, $C^2$ to the vessel next below, as above described, so that a thorough concentration or separation of the heavier and lighter materials takes place.

The aprons E, $E'$ and $E^2$, and the pocket $E^3$, are provided at the tops with inwardly extending annular flanges which project over the edges or rims of the corresponding vessels.

On the shaft B is secured a pulley G connected by a belt H with other machinery, for imparting a rotary motion to the shaft B and the vessels C, $C'$, $C^2$, $C^3$ secured on the said shaft.

In order to impart a vibratory motion to the shaft B and the vessels secured thereon, the following arrangement is made: A spring I is coiled around the shaft B and is interposed between the washers J and $J'$, of which the washer J rests on top of the bearing $A'$ while the other washer $J'$ rests on the under side of the hub of the pulley G. Thus by the arrangement described the shaft B is spring-supported and is free to yield in the direction of its axis. On the lower end of the shaft B is secured a cam K having ratchet teeth in mesh with ratchet teeth on a similar cam $K'$, mounted to rotate loosely on the shaft B, and provided with a pulley $K^2$, abutting with its hub against the under side of the bearing $A'$, to hold the pulley $K^2$ against sliding movement on the shaft B. The pulley $K^2$ is connected by a belt L with other machinery, for imparting a rotary motion to the pulley K² and the cam K', to increase the vibratory action of the cams K and K', as the teeth of one guide over the teeth of the other. It is understood that when the shaft B is rotated and the cam K' held stationary, a vibratory action would be given to the shaft B in the direction of its length, owing to the teeth of the cam K gliding over the teeth of the cam K'; but by having the cam K' also rotating, it is evident that the vibratory motion given to the shaft B is increased. By the arrangement described, the vibratory or jigging movement given to the shaft B and the vessels C, C', C² and C³ can be regulated to any desired degree while the machine is in motion, that is, by rotating the pulley K² and the cam K' faster or slower, as desired.

The operation is as follows: When the machine is running the vessels C, C', C² and C³ are rotated at a high speed, and at the same time a vibratory motion is given to the vessels in the direction of the axis thereof, and as the material is conveyed by way of the chute D into the uppermost vessel C, it is evident that the material is subjected to centrifugal action, and the lighter material is thrown out of the vessel C while the heavier material is retained under the riffles C⁴, C⁵, which riffles also retard the material in its outward movement. The lighter material discharged from the vessel C is conducted by the aprons E, F into the second vessel C', in which this material is subjected to centrifugal action the same as described in reference to the vessel C, and this operation is repeated with the several vessels next below, so that a thorough and effective concentration of the material takes place. The lighter material thrown out from the last vessel C³ is conducted by the apron or pocket E³ to one side of the machine. Now a large amount of material can be treated and cleaning up of the material retained in the several vessels is resorted to, from time to time, as circumstances may require. The concentrates obtained are treated subsequently in any suitable manner. The vessels C, C', C² and C³ are preferably secured to the shaft B by suitable sets of nuts and washers N engaging the bottom of the vessel at the inner and outer sides thereof, as plainly indicated in the drawing, the nuts screwing on the threaded portions of the shaft B. It is understood that the heaviest materials are retained in the uppermost vessel C, and the next heavier in the following vessels, and the several vessels C, C', C² and C³ gradually increase in size, to accomplish the separation of the materials as they decrease in grade. By having the riffles C⁴ arranged spirally the retained materials can be readily swept or brushed to the center of the corresponding vessel and then removed from the same when cleaning up.

Having thus described my invention, I claim as new and desire to secure by Letters Patent:

1. A concentrator comprising a plurality of open-top centrifugal vessels located one above the other and rotating in unison, fixed annular aprons each surrounding a vessel and spaced therefrom, each apron having an inwardly extending flange at its top extending over the rim of the vessel, the aprons being each provided with a fabric extension secured to its lower edge and reaching into the next vessel below.

2. A concentrator comprising a plurality of centrifugal vessels adapted to receive the material to be concentrated, the vessels being arranged one above the other and rotating in unison, the said vessels increasing in size from the uppermost downward, fixed annular aprons each surrounding a vessel and spaced therefrom for receiving the material thrown out of the vessels, each apron being provided with a fabric extension secured to its lower edge and reaching into the next following vessel below, and means for receiving the lighter material thrown out by the lowermost vessel and conducting it to one side of the concentrator.

3. A concentrator, comprising a vertically disposed shaft, a plurality of open-top centrifugal vessels secured on the said shaft one above the other, fixed means surrounding the vessels for receiving the material thrown out of the vessel by centrifugal action, the means surrounding one vessel being arranged for conducting the thrown out material into the next vessel below, a pulley secured on the said shaft below the lower vessel, means for driving the pulley to rotate the shaft, a spring on the shaft below the pulley and interposed between the hub of said pulley and a bearing for the lower part of the shaft, a cam secured on the lower end of said shaft, a cam mounted to rotate loosely on the shaft and provided with a pulley abutting with its hub against the under side of said bearing to hold the pulley against sliding movement on the shaft, means for driving the said pulley to rotate the cam, the said driven cam having ratchet teeth engaging similar teeth on the fixed cam to impart a vibrating motion to the shaft in the direction of its axis.

4. A concentrator, comprising a vertically disposed shaft, a plurality of open-top centrifugal vessels secured to the said shaft one above the other, each vessel having a spiral riffle on its inner face and a fixed annular apron surrounding each vessel and spaced therefrom for receiving the material thrown out of the vessels, the apron surrounding one vessel having a canvas extension secured to its lower edge and reaching into the next vessel below.

5. A concentrator, comprising a vertically disposed shaft, a plurality of open-top centrifugal vessels secured to the said shaft one above the other, and located in different horizontal planes, each vessel having a spiral riffle on its inner face, a fixed annular apron surrounding each vessel and spaced therefrom for receiving the material thrown out of the vessels, each apron having an inwardly extending flange at its top extending over the rim of the vessel, and a canvas extension at the bottom of the apron reaching into the next vessel below and delivering the thrown out material to said last mentioned vessel, and means for rotating the said shaft and imparting a vibratory motion to the same.

6. A concentrator comprising a main frame having side members inclining toward each other, and connected at the top and bottom, the frame being provided with vertically alined bearings, a shaft mounted to turn in said bearings, a plurality of open-top centrifugal vessels secured on the said shaft one above the other, the bottom of one vessel being above the top of the succeeding vessel, the said vessels increasing in size from the uppermost downward, and each vessel having a spiral riffle on its inner face, an annular apron surrounding each vessel and secured to the side members of the frame, each apron being spaced from the corresponding vessel and having an inwardly extending flange at its top extending over the rim of the vessel, and each apron having an extension secured to its lower edge and reaching into the next vessel below and delivering the thrown out material to said last mentioned vessel.

7. A concentrator comprising a frame provided with vertically alined bearings, a vertically disposed shaft journaled in said bearings, concentrating devices carried by said shaft, a pulley secured on the said shaft above the lower bearing, means for driving the pulley to rotate the shaft, a spring on the shaft between the hub of said pulley and the bearing for yieldingly supporting the shaft, a cam fixed on the end of the shaft below the said lower bearing, a cam mounted to rotate loosely on the shaft and provided with a pulley, the hub of which engages the under side of said bearing, means for driving the said pulley to rotate the cam, the said driven cam being provided with ratchet teeth engaging similar teeth on the said fixed cam for imparting a varying vibratory motion to the shaft according to the speed of the said driven cam.

In testimony whereof I have signed my name to this specification in the presence of two subscribing witnesses.

RAY HALLIC MANLEY.

Witnesses:
HYRUM P. FOLSOM,
HENRY T. VAN PELT.